March 17, 1936.    G. WILMINK    2,034,320

FREEWHEEL HUB FOR CYCLES

Filed Nov. 7, 1935

Inventor
Gerrit Wilmink
by
Atty.

Patented Mar. 17, 1936

2,034,320

UNITED STATES PATENT OFFICE 2,034,320

FREEWHEEL HUB FOR CYCLES

Gerrit Wilmink, Hengelo, Netherlands

Application November 7, 1935, Serial No. 48,751
In the Netherlands November 12, 1934

1 Claim. (Cl. 192—6)

With a view to facilitating the detachment of the rear wheel of a cycle, it has already been proposed to provide the hub of said wheel with a driving cone adapted, when rotating in forward direction, to operatively engage the hub through the free-wheel mechanism, and provided on its outer face with a clutch member cooperating with a mating member on the sprocket ring, the latter being mounted for rotation about—but locked against axial sliding movement on—a nipple receiving the corresponding end portion of the pinning axle.

In a known construction of this type, a sleeve is provided for holding the driving cone and the fixed cone in position relative to one another, and to the hub casing so as to prevent the various parts located within the casing from falling out when the wheel is detached. Owing to the provision of said sleeve, which surrounds the pinning axle, the diameters of the casing and of the parts located therein must exceed those of a free-wheel hub in which the sprocket ring is rigidly secured to the driving cone, and since the manufacture of cycle hubs is standardized throughout, it is clear, that a free-wheel hub fitted with such a sleeve is relatively expensive to make.

My present invention has for its object a free-wheel hub in which the sprocket ring is also separable from the driving cone, but in which the various parts located within the hub casing are prevented from falling out when the rear wheel is detached, without the aforesaid sleeve being provided, so that the casing and associated parts can be made to standard.

In accordance with my invention, the pinning axle is screw-threaded at the end opposite the sprocket ring to receive the fixed cone, whereas the other end portion of the axle is in screw-threaded engagement with the nipple and provided with a collar or other suitable abutment. Said abutment is adapted, when the pinning axle is screwed out from the nipple, to engage the driving cone, whereby both cones and the intermediate parts, as well as the hub casing are suitably held together.

Figure 1:
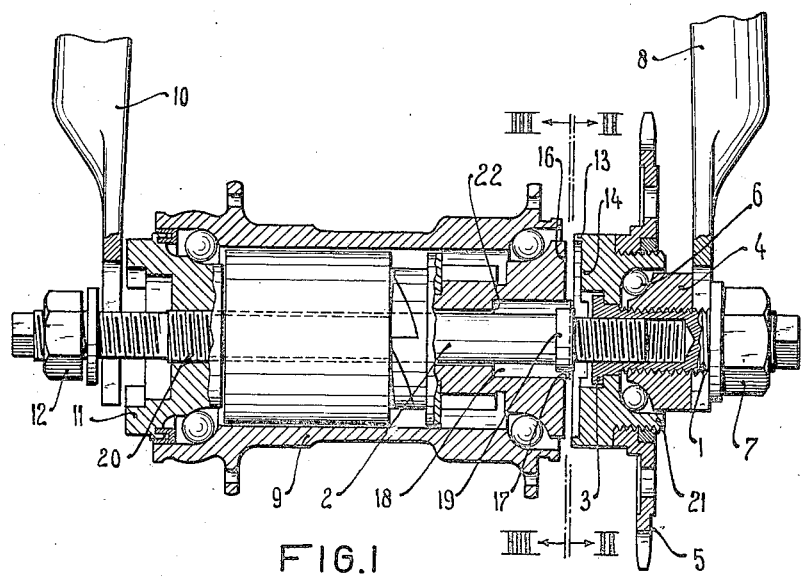
Figures 2, 3:
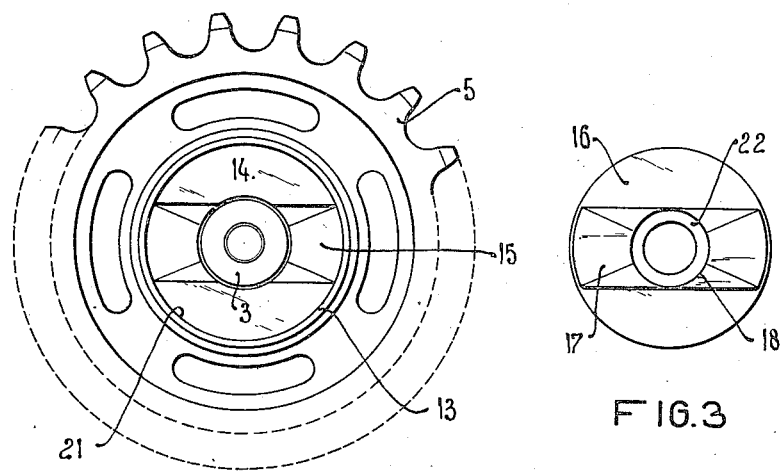

Referring to the annexed drawing, which illustrates, by way of example only, a free-wheel hub constructed in accordance with my present invention:

Fig. 1 is a longitudinal sectional view of the hub, with the pinning axle not fully tightened, Fig. 2 is a side view of the hub looking in the direction of the arrows II—II in Fig. 1, and Fig. 3 is a side view of the driving cone, looking in the direction of the arrows III—III in Fig. 1.

The right hand side end portion of the pinning axle 2 is screwed into the threaded bore of a nipple 1. Said nipple is provided with a flange 3 at its left hand side end and is externally threaded for the reception of a ball-bearing ring 4. Mounted intermediate the flange 3 and the ring 4 is the companion ball-bearing ring 21, secured to which is the sprocket 5, balls 6 being interposed between said rings to allow the wheel 5 to freely rotate about the axle 2. By means of a nut 7 on the right hand side end of nipple 1, the latter is secured to the open-slotted prong 8 of the rear wheel fork of the cycle frame.

The axle 2 extends centrally through the hub casing 9 and its screw-threaded left hand side end portion 20 is secured to the open-slotted prong 10 of the rear wheel fork. As shown, said prong is clamped between the fixed cone 11 and a nut 12, both screwed on the axle 2.

The left hand side face of the ball-bearing ring 21 has two segmental projections 14 on opposite sides of depressions 15, and also a circumferential ridge 13.

Rotatable about the axle 2 is the usual driving cone 16 having a sliding fit with the ridge 13 and provided on its right hand side face with projections 17 adapted to enter the depressions 15 of ring 21, so as to couple the parts 16 and 21. Through a suitable portion of its length, the central bore of cone 16 is enlarged to provide for an annular space 18 between the axle 2 and the inner wall of the cone, so that a collar 19 on the axle 2 has freedom of sliding movement therein. The bottom of the said enlarged portion of the bore forms a shoulder 22.

If the rear wheel is to be fixed to the cycle frame, the nipple 1 with associate parts (rings 4, 21 and sprocket 5) is secured to the prong 8 of the rear wheel fork by means of the nut 7, whereupon the wheel is placed with its hub centrally between the open-slotted ends of the prongs 8, 10, so that the claws or projections 17 enter the depressions 15, it being understood that the axle 2 should be screwed out to the left so far as to disengage the nipple 1. Thereupon, the axle 2 is screwed into the nipple 1 and secured to the prong 10 of the rear wheel fork by means of the nut 12.

If the rear wheel is to be taken out, all that is necessary is releasing nut 12 and screwing axle 2 out so far that it disengages the nipple 1 and collar 19 abuts against shoulder 22 of cone 16. Thereupon, the parts 16 and 21 are moved away from one another and the rear wheel withdrawn from the rear wheel fork. During this removal, the parts located within the casing 9 cannot fall out, since the casing is closed on either side by the cones 16 and 11. The nipple 1 with associate parts remains secured to the prong 8 of the rear wheel fork.

What I claim is:

In a free-wheel hub for a cycle wheel, the combination of a hub casing, an axle extending axially through said casing, a driving cone mounted for rotation about said axle near one end thereof and adapted when rotating in forward direction to operatively engage said casing, an abutment on said driving cone, coupling means on said driving cone, an internally threaded nipple member in threaded engagement with said end of the axle, a sprocket mounted for rotation about said nipple member but prevented from axial movement thereon, coupling means on the sprocket cooperating with the said coupling means on the driving cone, a fixed cone screwed on the axle near the end opposite the driving cone, and a projection provided on said axle near the nipple member and axially spaced from the said abutment, said projection being adapted for cooperation with said abutment to hold said casing and said cones together in substantially proper relative positions when the axle is screwed out from the nipple member.

GERRIT WILMINK.